US006922256B1

(12) United States Patent
Davis

(10) Patent No.: US 6,922,256 B1
(45) Date of Patent: Jul. 26, 2005

(54) METHOD AND APPARATUS FOR USING A PRINTING SYSTEM TO TRANSMIT DATA TO A SERVER

(75) Inventor: Nathan Eugene Davis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 09/717,525

(22) Filed: Nov. 21, 2000

(51) Int. Cl.[7] .............................. G06F 15/00; B31J 5/30
(52) U.S. Cl. ........................................ 358/1.15; 400/61
(58) Field of Search .......................... 358/1.15; 400/61, 400/109, 11, 110.61, 76

(56) References Cited

U.S. PATENT DOCUMENTS

| 5,580,177 A | 12/1996 | Gase et al. ................... 400/61 |
| 5,982,997 A | 11/1999 | Stone et al. ................ 358/1.15 |
| 5,995,723 A | 11/1999 | Sperry et al. .............. 358/1.15 |
| 6,310,694 B1 * | 10/2001 | Okimoto et al. ........... 358/1.15 |
| RE38,111 E * | 5/2003 | LaDue et al. ................. 400/68 |

* cited by examiner

*Primary Examiner*—Kimberly Williams
*Assistant Examiner*—Saeid Ebrahimi-DehKordy
(74) *Attorney, Agent, or Firm*—Duke W. Yee; David A. Mims, Jr.; Wayne P. Bailey

(57) ABSTRACT

A method and apparatus in a data processing system for transferring printer data. A printer data stream is received. A format is identified for the printer data stream in response to receiving the printer data stream. Data is extracted from the printer data stream to form extracted data. The extracted data is formatted into a format for a destination to form formatted data. The formatted data is transmitted to the destination.

21 Claims, 8 Drawing Sheets

*FIG. 5*

| | | | | |
|---|---|---|---|---|
| My Small Business<br>FED. ID. NO. 11-2223344<br>18765 Oak Lane<br>AnyTown USA | PAGE NO.<br>1 | INVOICE NO.<br>A3ER2 | INVOICE DATE<br>9/3/00 | CUST. NO.<br>39426 |
| | INVOICE | | MTYRH<br>WORK ORDER NO. | B.O. |

| | SOLD TO | Some Customer<br>P.O. Box 18976<br>OtherTown USA | SHIP TO | Some Customer<br>ATTN. CUSTOMER REP<br>18637 Ash Drive<br>Metropolis, USA |
|---|---|---|---|---|

| P.O. NO. | Ship Via | F.O.B. | Terms |
|---|---|---|---|
| 10985743 | UPS GROUND | DESTINATION | NET 30 |

| BUYER | DATE REQUESTED | LOCATION | SALESPERSON | TERRITORY |
|---|---|---|---|---|
| JANE DOE | 9/18/00 | A3 | JOHN SMITH | X32 |

| Item No. | Description | Qty Ordered | Unit Price | Total |
|---|---|---|---|---|
| A25-0109 | #3 WIDGET MOUNT | 37 | $12.50 | $462.50 |
| A32-0452 | #3 WIDGET | 153 | $2.00 | $306.00 |
| | | | | |
| | | | | |
| | | | | |
| | | | Total: | $762.50 |

```
                              600

My Small Business           PAGE    INVOICE    INVOICE    CUST.
FED. ID. NO. 11-2223344     NO.     NO.        DATE       NO.
18765 Oak Lane              1       A3ER2      9/3/00     39426
AnyTown USA
                                          MTYRH
                            INVOICE    WORK ORDER    B.O.

S  Some Customer                  S  Some Customer
  O  P.O. Box 18976                 H  ATTN: CUSTOMER REP
  L  OtherTown USA                  I  18637 Ash Drive
  D                                 P  Metropolis, USA T                                 T
  O                                 O
  P.O. NO.   Ship Via               F.O.B.          Terms
  10985743   UPS GROUND             DESTINATION     NET 30

BUYER      DATE REQUS             LOCATION   SALESPERSON   TERRITORY
  JANE DOE   9/18/00                A3         JOHN SMITH    X32

Item No.   Description                 Qty        Unit         Total
                                         Ordered    Price A25-0109   #3 WIDGET MOUNT              37        $12.50       $462.50
  A32-0452   #3 WIDGET                   153         $2.00       $306.00
                                                    Total:       $762.50
```

XXXXXXXXXXXXXXXXXXXXXXXX
XXXXXXXXXXXXXXXXXXXXXXXX
XXXXXXXXXXXXXXXXXXXXXXXX    XXXXXXX    XXXXXXXX    XXXXXXX
XXXXXXXXXXXXXXXXXXXXXXXX
XXXXXXXXXXXXXXXXXXXXXXXX                XXXX        XXXXXXX
                        INVOICE

XXXXXXXXXXXXXXXXXXXXX        XXXXXXXXXXXXXXXXXXXXXX
XXXXXXXXXXXXXXXXXXXXX        XXXXXXXXXXXXXXXXXXXXXX
XXXXXXXXXXXXXXXXXXXXX        XXXXXXXXXXXXXXXXXXXXXX
XXXXXXXXXXXXXXXXXXXXX          XXXXXXXXXXXXXXXXXXXX
XXXXXXXXXXXXXXXXXXXXX          XXXXXXXXXXXXXXXXXXXX

XXXXXXXXXX XXXXXXXXXXXXXX XXXXXXXXXXXXXX XXXXXXXXXXXXXX

XXXXXXXXXX XXXXXXXXX  XXXXXXX        XXXXXXXXXX XXXXX

XXXXXXXX XXXXXXXXXXXXXXXXXXXX  XXXXXXX XXXXX.XX XXXXX.XX
<repeat previous pattern up to 24 times>

800

802

| My Small Business |
| FED. ID. NO. 11-2223344 |
| 18765 Oak Lane |
| AnyTown USA |

PAGE NO. 1

INVOICE NO. A3ER2  806

INVOICE DATE 9/3/00  808

CUST. NO. 39426  810

MTYRH  812

804

S O L D T O
| Some Customer |
| P.O. Box 18976 |
| OtherTown USA |

INVOICE    WORK ORDER    B.O.

S H I P T O
| Some Customer |
| ATTN. CUSTOMER REP |
| 18637 Ash Drive |
| Metropolis, USA |  814

P.O. NO.   Ship Via   816
| 10985743 UPS GROUND |

F.O.B.   Terms   818
| DESTINATION   NET 30 |

BUYER            DATE REQUS            LOCATION        SALESPERSON  TERRITORY
820 | JANE DOE |   | 9/18/00 |  824   | A3 |              | JOHN SMITH   X32 |  826
                                       824

Item No.   Description                  Qty Ordered   Unit Price   836  Total

| A25-0109 | | #3 WIDGET MOUNT |        | 37 |        | $12.50 |      | $462.50 |
| A32-0452 | | #3 WIDGET |              | 153 |       | $2.00 |       | $306.00 |
    828           830                     832            834   Total:   $762.50

| INVOICE_NO | | | A3ER2 |
|---|---|---|---|
| WORK_ORDER_NUMBER | | | MTYRH |
| INVOICE_DATE | | | 03 September 2000 |
| CUSTOMER_NO | | | 39426 |
| SUPPLIER_ADDRESS | | | |
| | NAME | | My Small Business |
| | LINE_1 | | 18765 Oak Lane |
| | CITY | | AnyTown |
| | COUNTRY | | USA |
| SUPPLIER_TAX_ID | | | 11-2223344 |
| SOLD_TO | | | |
| | NAME | | Some Customer |
| | LINE_1 | | P.O Box 18976 |
| | CITY | | OtherTown |
| | COUNTRY | | USA |
| SHIP_TO | | | |
| | NAME | | Some Customer |
| | LINE_1 | | ATTN: CUSTOMER REP |
| | LINE_2 | | 18637 Ash Drive |
| | CITY | | Metropolis |
| | COUNTRY | | USA |
| PO_NUMBER | | | 10985743 |
| SHIP_CODE | | | UPS GROUND |
| FOB | | | DESTINATION |
| TERMS | | | NET 30 |
| BUYER | | | JANE DOE |
| DATE_REQUESTED | | | 18 September 2000 |
| LOCATION | | | A3 |
| SALESPERSON | | | JOHN SMITH |
| TERRITORY | | | X32 |
| ITEM | | | |
| | NUMBER | | A25-0109 |
| | DESCRIPTION | | #3 WIDGET MOUNT |
| | QTY | | 37 |
| | UNIT_PRICE | | 12.50 |
| | TOTAL | | 462.50 |
| ITEM | | | |
| | NUMBER | | A32-0452 |
| | DESCRIPTION | | #3 WIDGET |
| | QTY | | 153 |
| | UNIT_PRICE | | 2.00 |
| | TOTAL | | 306.00 |

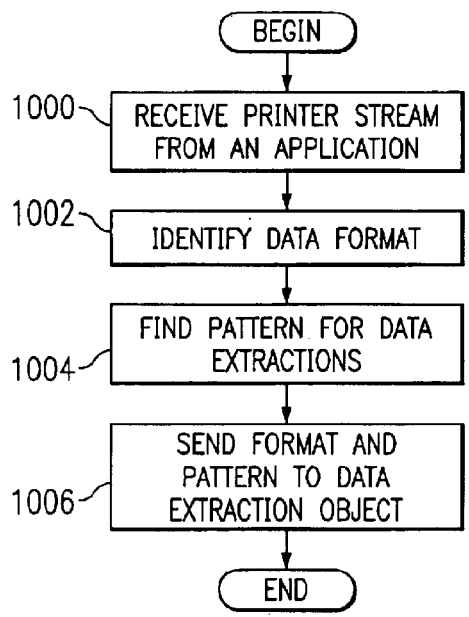
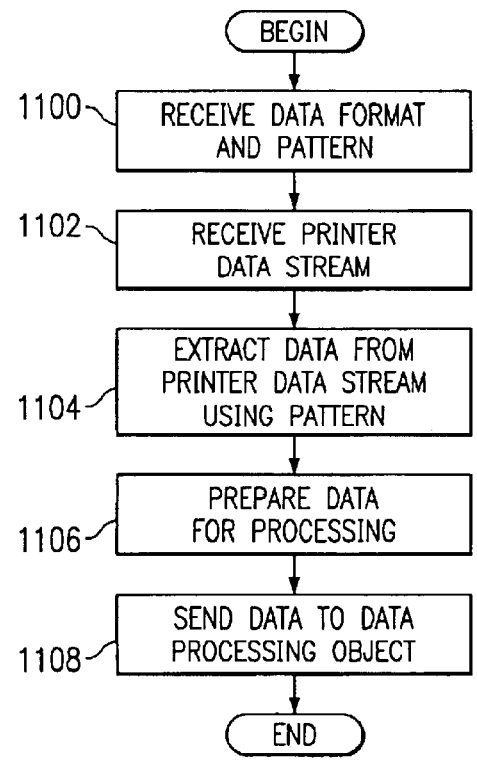
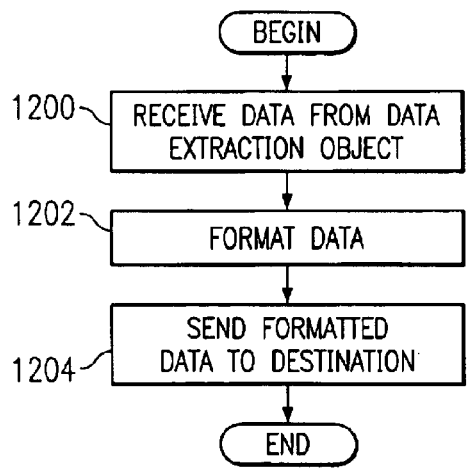

METHOD AND APPARATUS FOR USING A PRINTING SYSTEM TO TRANSMIT DATA TO A SERVER

BACKGROUND OF THE INVENTION

1. Technical Field

The present invention relates generally to an improved data processing system, and in particular to a method and apparatus for transferring data. Still more particularly, the present invention provides a method and apparatus for transmitting legacy data to a destination.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Many businesses on the Internet use commercially available packages, such as accounting packages. These packages are typically directed towards consumers and small businesses and do not provide easy access to data or an ability to transmit the data to other systems. As these businesses participate in business-to-business transactions on the Internet, this deficiency places them at a disadvantage. For example, some suppliers or distributors offer discounts for electronic invoices. With the presently available commercial packages, generating an electronic invoice for a supplier requires much effort because these packages do not provide an ability to transmit data to other non-compatible software systems. Presently, these businesses must use custom software specifically written to generate electronic invoices or generate them by hand.

Therefore, it would be advantageous to have an improved method and apparatus for transmitting data from these more limited consumer or small business grade program to a destination such as a server.

SUMMARY OF THE INVENTION

The present invention provides a method and apparatus in a data processing system for transferring printer data. A printer data stream is received. A format is identified for the printer data stream in response to receiving the printer data stream. Data is extracted from the printer data stream to form extracted data. The extracted data is formatted into a format for a specific destination to form formatted data. The formatted data is transmitted to the destination.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an illustration of an invoice processed by the mechanism of the present invention in accordance with a preferred embodiment of the present invention;

FIG. 6 illustrates a printer data stream from which data is extracted by a data extraction object in accordance with a preferred embodiment of the present invention;

FIG. 7 is an illustration of a pattern used for data extraction in accordance with a preferred embodiment of the present invention;

FIG. 8 is a graphical representation of a pattern overlaying a printer stream in accordance with a preferred embodiment of the present invention;

FIG. 9 is an illustration of a data structure containing data extracted from a printer data stream in accordance with a preferred embodiment of the present invention;

FIG. 10 is a flowchart of a process used for processing a printer data stream in accordance with a preferred embodiment of the present invention;

FIG. 11 is a flowchart of a process used for extracting data in accordance with a preferred embodiment of the present invention; and FIG. 12 is a flowchart of a process used for formatting and transmitting data in accordance with a preferred embodiment of the present invention.

DETAILED DESCRIPTION OF THE PREFERRED EMBODIMENT

Figure 1:
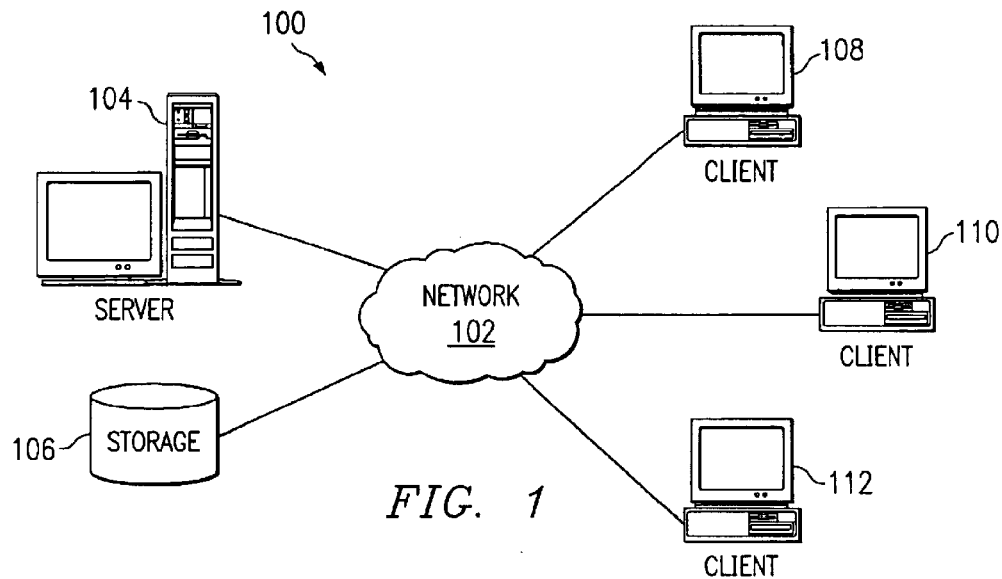
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
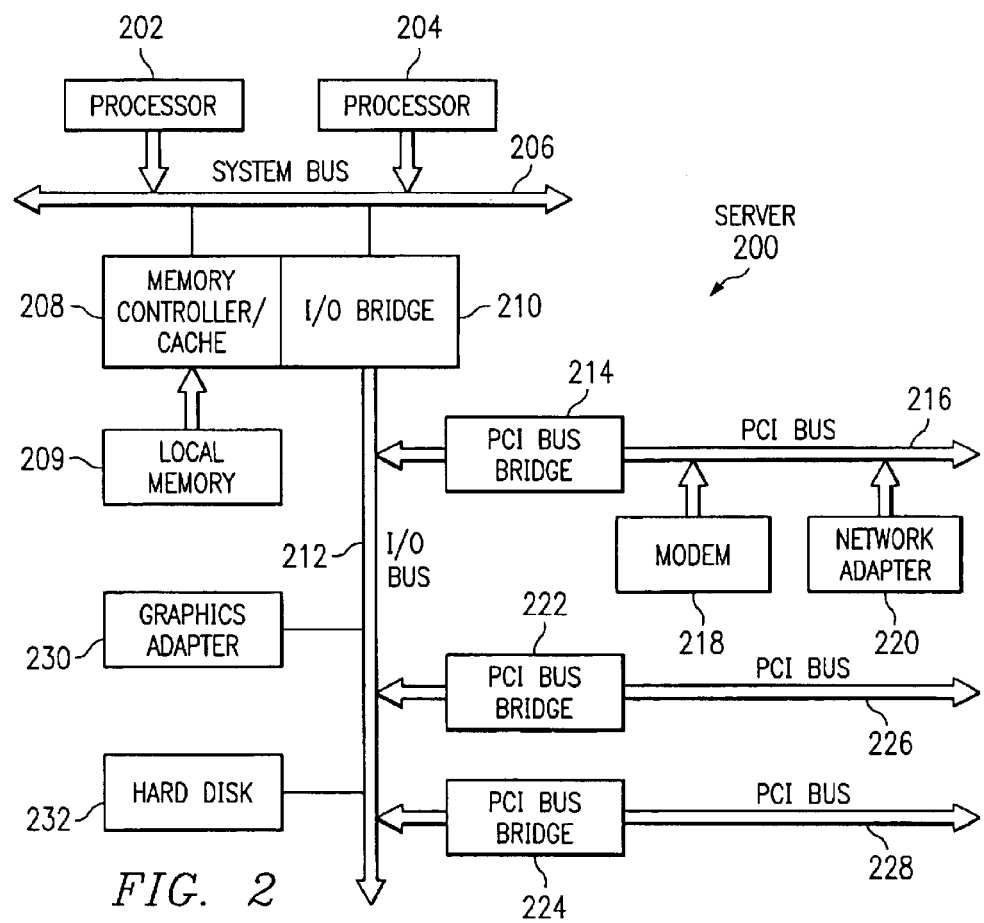
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
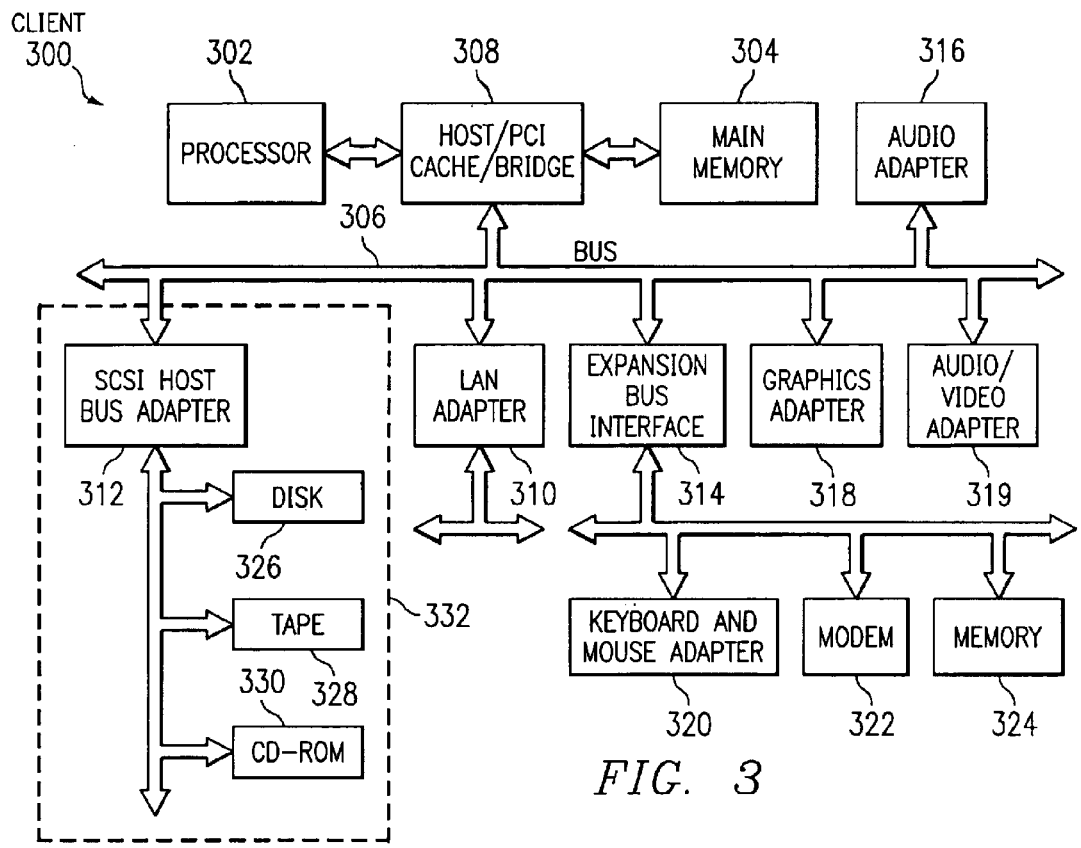
FIG. 3 is a block diagram illustrating a data processing system in accordance with a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance. The present invention provides a method, apparatus, and computer implemented instructions for using a printing subsystem to transmit data to a server, such as server 104 in FIG. 1. Of course, the data transfer may be to any data processing system, such as from client 108 to client 110, or from server 104 to client 112 or storage 106. The mechanism of the present invention allows information from an application to be sent to a printer driver system, which extracts the relevant data, formats the data, and transmits the data to a destination. In this manner, no changes are needed to the application and the formatting is provided through a printer driver system.

Figure 4:
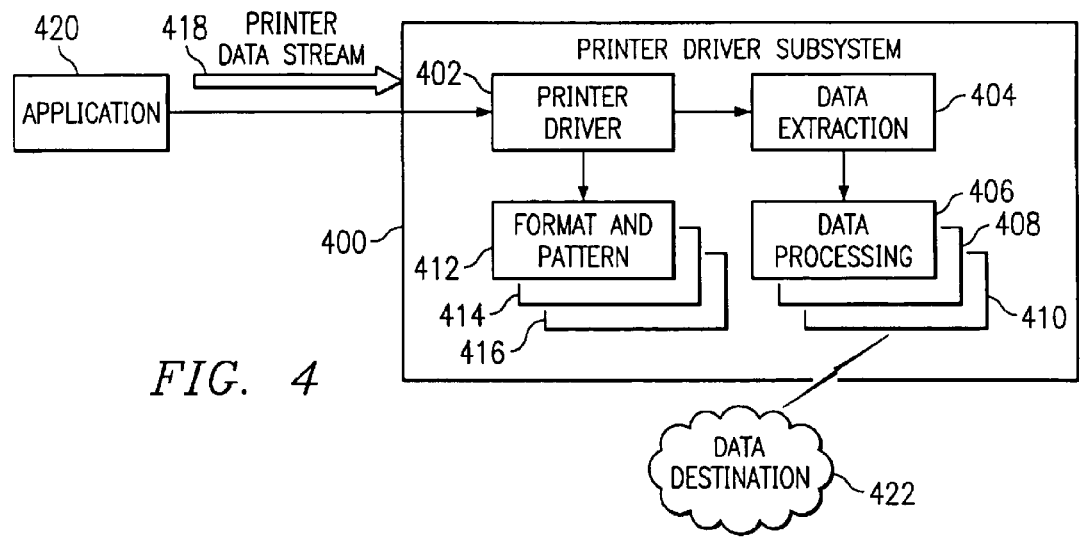
FIG. 4 is a diagram illustrating components used to transmit data from an application to a destination using a printer driver subsystem in accordance with a preferred embodiment of the present invention.

Turning next to FIG. 4, a diagram illustrating components used to transmit data from an application to a destination using a printer driver subsystem is depicted in accordance with a preferred embodiment of the present invention. Printer driver subsystem 400 may be used in a data processing system, such as data processing system 200 or data processing system 300 to place data in an appropriate format for a destination.

In this example, printer driver subsystem 400 includes a printer driver 402, a data extraction object 404, data processing objects 406–410, and formats and patterns 412–416. Printer driver subsystem receives a printer data stream 418 from application 420 and formats the data for use at data destination 422. In this example, application 420 may be a financial package, which does not provide an ability to export data in a format recognized by data destination 422. For example, an electronic invoice may be generated by application 420. According to the present invention, this invoice is printed to generate a printer data stream 418. This printer data stream is received by printer driver 402, which examines printer data stream 418 to determine the data format of data within printer data stream 418. A pattern is identified for use in data extraction by printer driver 402 from formats and patterns 412–416. Printer data stream 418 is passed on to data extraction object 404, which uses the identified pattern to "scrape" or extract data from the printer data stream and prepare this data for processing.

Thereafter, this extracted data is then passed to a data processing object, such as data processing object 406, 408, or 410. The data processing object formats the extracted data and sends it to data destination 422. Each data processing object may be configured to format data into a particular format for a particular destination. For example, data processing object 406 may generate an extensible markup language (XML) document while data processing object 408 generates a hypertext markup language (HTML) document. Further, data processing object 406 may send the formatted data to one server, while data processing object 408 sends the formatted data to another server. Data destination 422 make take various forms. For example, this destination may be a local database or a remote server. On a remote server, a database, an enterprise Java bean, a servlet, an applet, or a script may be the target within the server. The data processing object may communicate with these programs or processes to transfer the formatted data.

In this example, the electronic invoice generated by application 420 is processed by printer driver 402 to identify the format of data within printer data stream 418. A pattern is selected by printer driver 402 and used by data extraction object 404 to extract the appropriate data from printer data stream 418. The pattern defines the format in which the extracted data should be stored for use in generating the appropriate output for the destination. The appropriate output is based on the format identified for printer data stream 418. In other words, data for the invoice is parsed out from printer-specific or printer formatting information in printer data stream 418. A data processing object, such as data processing object 406, formats the data into a form for use by data destination 422. The format is identified by printer driver 402 based on information within printer data stream 418. This format is the format that is to be used to send the data to data destination 422. For example, the data format may take a form of an extensible markup language (XML) document.

Turning next to FIG. 5, an illustration of an invoice processed by the mechanism of the present invention is depicted in accordance with a preferred embodiment of the present invention. Invoice 500 is an example of a document printed from a data stream sent to a printer, which would be generated by application 420 in FIG. 4. In this example, data is sent to generate formatting, such as the rows and columns, as well as different font types in invoice 500. In this example, data found in fields 502–546 is identified by print driver 402 and extracted by data extraction object 404. Based on the data found in different fields, printer driver 402 may identify a format and pattern for use by data extraction object 404.

Turning next to FIG. 6, data structure 600 illustrates a pattern, which may be used to store data when the data is extracted from printer data stream 418 by data extraction object 404 in FIG. 4. In this example, printer data stream 600 stores the data in various rows and columns for formatting by a data processing object, such as data processing object 406.

With reference now to FIG. 7, an illustration of a pattern used for data extraction is depicted in accordance with a preferred embodiment of the present invention. Pattern 700 illustrates fields that will be extracted when compared to data from a printer data stream. Pattern 700 may be defined graphically by a user highlighting fields in a graphical representation of a printer data stream such as printer data stream 600 in FIG. 6. Alternatively, other mechanisms may be used to implement or represent a pattern. For example, text triplets, such as a line number, starting column, and length, may be used.

Turning next to FIG. 8, a graphical representation of a pattern overlaying a printer stream is depicted in accordance with a preferred embodiment of the present invention. In this example, invoice 800 contains fields 802–836, which illustrate data that is to be extracted from an invoice such as that in printer data stream 600 in FIG. 6 using pattern 700 in FIG. 7.

With reference now to FIG. 9, an illustration of a data structure containing data extracted from a printer data stream is depicted in accordance with a preferred embodiment of the present invention. Data structure 900 contains data extracted from printer data stream 600 in FIG. 6 using pattern 700 in FIG. 7.

With reference now to FIG. 10, a flowchart of a process used for processing a printer data stream is depicted in accordance with a preferred embodiment of the present invention. The process shown in FIG. 10 may be implemented in printer driver 402 in FIG. 4.

The process begins by receiving a printer data stream from an application (step 1000). The data format is identified (step 1002). For example, the string in INVOICE found in field 546 in FIG. 5 may be used to indicate that the target format is an electronic invoice. The identification of the customer in field 504 may be used to identify a preferred data interexchange format for the electronic invoice. Next, a pattern for data extractions is identified (step 1004). The data may be stored in various formats, such as row/column list pairs associated with specific data and possibly associated with a specific data type. An example data structure is data structure 700 in FIG. 7. The format definition for this data may be stored in different forms, such as extensible markup language (XML), text, or binary data. The identified format and pattern is sent to a data extraction object (step 1006). This data extraction object is used to extract or "scrape" data from the printer data stream. The data extracted from the data stream is stored using the pattern identified for the particular format.

With reference now to FIG. 11, a flowchart of a process used for extracting data is depicted in accordance with a preferred embodiment of the present invention. The process illustrated in FIG. 11 may be implemented in data extraction object 404 in FIG. 4.

The process begins by receiving a data format and pattern (step 1100). This data format and pattern is received from a print driver, such as print driver 402 in FIG. 4. The printer data stream is then received (step 1102). Data is extracted from the printer data stream using the identified pattern (step 1104). The extracted data is prepared for processing (step 1106). In this step, the data extraction object uses the identified pattern to place extracted data from the printer data stream into specific locations and also may associate this data with a label. The associated data is kept in a collection with other associated data. This collection may be located in a data structure, such as data structure 900 in FIG. 9. The data structure may take various forms such as, for example, an XML document, a hash table, and a binary record. If the extracted data is stored in a binary format such as a hash table or binary record, the extraction step performed by the data extraction object also may convert the data into non-textual types, such as integer or data, as appropriate.

The data is then sent to a data processing object for formatting (step 1108), with the process terminating thereafter. In this example, the data extraction object may send or select a particular data processing object from a set of data processing objects to send the data to a particular data destination.

Turning next to FIG. 12, a flowchart of a process used for formatting and transmitting data is depicted in accordance with a preferred embodiment of the present invention. The process illustrated in FIG. 12 may be implemented in a data processing object, such as data processing object 406 in FIG. 4.

The process begins by receiving data from the data extraction object (step 1200). The data is then formatted (step 1202). This format is based on the format identified by printer driver 402 in FIG. 4. The formatted data is then sent to the destination (step 1204), with the process terminating thereafter. The formatting of data may differ depending on the particular data processing object used. For example, one data processing object may generate an XML document, while another data processing object generates an HTML document.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, printer data driver 402 in FIG. 4 may exclude the step of examining the printer data stream to identify a data format and select a pattern for data extraction. Instead, a particular printer driver may be configured for a particular data format. As a result, a user may select from different printer drivers for a particular data format. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transferring printer data, the method comprising:
   receiving a printer data stream;
   identifying a format for the printer data stream from the received printer data stream;
   identifying a pattern for data extraction from the received printer data stream;
   extracting data from the printer data stream using the identified pattern to form extracted data;
   formatting the extracted data into a format for a destination using the identified format to form formatted data; and
   transmitting the formatted data to the destination.

2. The method of claim 1, wherein the receiving, identifying, formatting, extracting, and transmitting steps are performed in a printer driver subsystem.

3. The method of claim 1, wherein the destination is another data processing system.

4. The method of claim 3, wherein the another data processing system is connected to one of a local area network, an intranet, and an Internet.

5. The method of claim 1, wherein the destination is a program on the data processing system.

6. The method of claim 1, wherein the destination is one of a servlet, an applet, and a script.

7. A printer driver system comprising:
a printer driver, wherein the printer driver receives a printer data stream and identifies a format of the data to form an identified format and identifies a pattern associated with the identified format;
a data extraction object, wherein the data extraction object receives the printer stream and uses the identified pattern to extract data from the printer data stream; and
a data processing object, wherein the data processing object formats the extracted data to form formatted data and sends the formatted data to a destination.

8. The printer driver system of claim 7 further comprising:
additional data processing objects, wherein the data processing object and the additional data processing objects are each configured to format data for a particular format.

9. The printer driver system of claim 7, wherein the data processing system object communicates with at least one of a servlet, an applet, and a script at the destination and at least one of the additional data processing objects communicates with at least one of a servlet, an applet, and a script at another destination.

10. A data processing system comprising:
a bus system;
a communications unit connected to the bus system;
a memory connected to the bus system, wherein the memory includes as set of instructions; and
a processing unit connected to the bus system, wherein the processing unit executes the set of instructions to receive a printer data stream, identify a format for the printer data stream from the received printer data stream, identify a pattern for data extraction from the received printer data stream, extract data from the printer data stream using the identified pattern to form extracted data, format the extracted data into a format for a destination using the identified format to form formatted data, and transmit the formatted data to the destination using the communications unit.

11. The data processing system of claim 10, wherein the bus system is a single bus.

12. The data processing system of claim 10, wherein the bus system includes a primary bus and a secondary bus.

13. The data processing system of claim 10, wherein the processing unit includes a plurality of processors.

14. The data processing system of claim 10, wherein the communications unit is one of a modem and Ethernet adapter.

15. A data processing system for transferring printer data, the data processing system comprising:
receiving means for receiving a printer data stream;
format identifying means for identifying a format for the printer data stream from the received printer data stream;
pattern identifying means for identifying a pattern for data extraction from the received printer data stream;
extracting means for extracting data from the printer data stream using the identified pattern to form extracted data;
formatting means for formatting the extracted data into a format for a destination using the identified pattern to form formatted data; and
transmitting means for transmitting the formatted data to the destination.

16. The data processing system of claim 15, wherein the receiving means, identifying means, formatting means, extracting means, and transmitting means are located in a printer driver subsystem.

17. The data processing system of claim 15, wherein the destination is another data processing system.

18. The data processing system of claim 17, wherein the another data processing system is connected to one of a local area network, an intranet, and an Internet.

19. The data processing system of claim 15, wherein the destination is a program on the data processing system.

20. The data processing system of claim 15, wherein the destination is one of a servlet, an applet, and a script.

21. A computer program product in a computer readable medium for transferring printer data, the computer program product comprising:
first instructions for receiving a printer data stream;
second instructions for identifying a format for the printer data stream from the received printer data stream;
pattern identifying instructions for identifying a pattern for data extraction from the received printer data stream;
third instructions for extracting data from the printer data stream using the identified pattern to form extracted data;
fourth instructions for formatting the extracted data into a format for a destination using the identified pattern to form formatted data; and
fifth instructions for transmitting the formatted data to the destination.

* * * * *